(12) United States Patent
Delahaye et al.

(10) Patent No.: US 11,371,352 B2
(45) Date of Patent: Jun. 28, 2022

(54) DEVICE FOR HOLDING A CENTRIPETAL RADIAL AIR SAMPLING MEMBER

(71) Applicant: SAFRAN AIRCRAFT ENGINES, Paris (FR)

(72) Inventors: Thomas Nolwenn Emmanuel Delahaye, Moissy-Cramayel (FR); Alain Marc Lucien Bromann, Moissy-Cramayel (FR); Liliana Gomes Pereira, Moissy-Cramayel (FR); Delphine Hermance Maxime Parent, Moissy-Cramayel (FR); Kamel Benderradji, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 64 days.

(21) Appl. No.: 16/761,762

(22) PCT Filed: Nov. 13, 2018

(86) PCT No.: PCT/EP2018/081003
§ 371 (c)(1),
(2) Date: May 5, 2020

(87) PCT Pub. No.: WO2019/096757
PCT Pub. Date: May 23, 2019

(65) Prior Publication Data
US 2020/0263549 A1    Aug. 20, 2020

(30) Foreign Application Priority Data
Nov. 14, 2017 (FR) ..................... 1760693

(51) Int. Cl.
*F01D 5/08* (2006.01)
*F02C 6/08* (2006.01)
*F04D 29/32* (2006.01)

(52) U.S. Cl.
CPC .............. *F01D 5/085* (2013.01); *F02C 6/08* (2013.01); *F04D 29/322* (2013.01);
(Continued)

(58) Field of Classification Search
CPC .......... F01D 5/085; F01D 5/087; F01D 5/081; F01D 5/082; F01D 5/06; F01D 9/041;
(Continued)

(56) References Cited

U.S. PATENT DOCUMENTS

| 5,472,313 A | 12/1995 | Quinones et al. |
| 6,648,592 B2 | 11/2003 | Escure et al. |

(Continued)

FOREIGN PATENT DOCUMENTS

| EP | 1750012 A1 | 2/2007 |
| EP | 3135864 A1 | 3/2017 |
| FR | 2825413 A1 | 12/2002 |

OTHER PUBLICATIONS

Written Opinion of the International Searching Authority dated Jan. 21, 2019, issued in corresponding International Application No. PCT/EP2018/081003, filed Nov. 13, 2018, 5 pages.
(Continued)

*Primary Examiner* — Eric J Zamora Alvarez
(74) *Attorney, Agent, or Firm* — Christensen O'Connor Johnson Kindness PLLC (57) ABSTRACT

A holding device is used with a centripetal air sampling member of a rotor assembly that includes and downstream rotor discs and a centripetal air sampling member. The holding device has an annular support element with a housing configured to receive the air sampling member in a radial orientation, a first lateral extension, and a second lateral extension rigidly attached to the downstream rotor disc, extending substantially following the longitudinal axis and radially arranged externally with respect to the first (Continued)

extension. The holding device also includes a wedging ring axially arranged between a portion of the downstream rotor disc and the support element, the wedging ring being configured to simultaneously urge, under the action of a centrifugal force, the first extension in radial abutment against the second extension and the support element in radial abutment against a portion of the upstream rotor disc.

14 Claims, 5 Drawing Sheets

(52) U.S. Cl.
CPC ...... *F04D 29/324* (2013.01); *F05D 2230/644* (2013.01); *F05D 2250/11* (2013.01); *F05D 2250/75* (2013.01); *F05D 2260/36* (2013.01)

(58) Field of Classification Search
CPC .......... F01D 17/105; F01D 25/12; F02C 6/08; F02C 9/18; F04D 29/322; F04D 19/321; F04D 19/02; F04D 25/584; F04D 27/009; F04D 27/023; F04D 29/324; F05D 2220/321; F05D 2230/644; F05D 2230/642; F05D 2240/80; F05D 2250/11; F05D 2250/75; F05D 2260/36; F05D 2260/30; F05D 2260/37; F05D 2260/602

See application file for complete search history.

(56) References Cited

U.S. PATENT DOCUMENTS

| | | | |
|---|---|---|---|
| 7,390,167 B1* | 6/2008 | Bouiller | F02C 6/08 285/192 |
| 10,570,914 B2 | 2/2020 | Lueddecke et al. | |
| 2002/0182059 A1* | 12/2002 | Escure | F04D 29/582 415/115 |
| 2003/0101730 A1* | 6/2003 | Hein | F01D 5/085 60/785 |
| 2005/0172640 A1* | 8/2005 | Drevs | F01D 5/08 60/785 |
| 2007/0053770 A1 | 3/2007 | Lammas et al. | |
| 2007/0258813 A1* | 11/2007 | Klutz | F01D 5/087 416/90 R |
| 2010/0266387 A1* | 10/2010 | Bintz | F02C 6/08 415/115 |
| 2014/0090397 A1* | 4/2014 | Lund | F04D 29/321 60/785 |
| 2016/0333796 A1* | 11/2016 | Hugon | F01D 5/087 |
| 2017/0184118 A1* | 6/2017 | Lueddecke | F02C 6/08 |

OTHER PUBLICATIONS

International Preliminary Report on Patentability dated May 19, 2020, issued in corresponding International Application No. PCT/EP2018/081003, filed Nov. 13, 2018, 1 page.

International Search Report dated Jan. 21, 2019, issued in corresponding International Application No. PCT/EP2018/081003, filed Nov. 13, 2018, 7 pages.

Rapport De Recherche Preliminaire and Opinion dated Oct. 19, 2018, for French Application No. 1760693, filed Nov. 14, 2017, 6 pages.

* cited by examiner

DEVICE FOR HOLDING A CENTRIPETAL RADIAL AIR SAMPLING MEMBER

1. FIELD OF THE INVENTION

The present invention concerns the field of devices for holding a centripetal radial air sampling member of a rotor disc, in particular, of a turbine engine compressor. The invention also aims to a rotor assembly comprising such a device, a compressor comprising such an assembly and a turbine engine comprising such a compressor.

2. STATE OF THE ART

A turbine engine such as a turboprop or a turbojet engine comprises a primary duct wherein a primary flow circulates upstream to downstream. The turbine engine comprises a compressor assembly, a combustion chamber and a turbine assembly which are passed through by the primary flow. The compressor assembly comprising one or more compressor stages. Each compressor stage comprises, alternately, a row of stator blades and a row of mobile blades, each integral with a disc and which are passed through by the primary flow. Certain members of the turbine engine require to be cooled for it to operate correctly, such as a high-pressure turbine. Air sampling members of radial orientation make it possible to achieve air samplings at the level of the air duct of the compressor and to convey it to said members requiring to be cooled. To this end, an annular ferrule of a disc delimiting a portion of the inner wall of the primary duct comprises orifices which make it possible for an air passage from the primary duct to several centripetal sampling members arranged circumferentially around the axis of the turbine engine and which are each oriented to one of the orifices. These air sampling members are generally supported between two discs of the compressor by a holding device.

An air sampling member holding device example is described in document FR-A1-2825413. In this document, each air sampling member is carried by an annular holding device having a rear radial wall and a front radial wall. The rear radial wall is fixed by means of a bolt on a radial tab of a downstream disc of the compressor and the front radial wall is equipped with a first axial rib in contact with a second axial rib of the downstream disc. However, such a configuration requires an axial space between the air sampling member and the rear wall due to the bolted connection, which clutters the already reduced space between the compressor discs. The bolted connection also impacts the mass of the turbine engine, as the greater the number of air sampling members, the greater is the number of bolted connections. The holding device also involves a problem of holding sampling members during the rotation of the turbine engine and in particular, under the action of the centrifugal force.

Document EP-B1-1750012 also describes an abutment device for holding sampling members, each arranged in a housing of an inner annular ferrule following the axis of a rotor disc. Each sampling member comprises a collar integral with it and which is received in an annular lateral groove of the inner ferrule. The collar comprises a flat spot in contact with an annular abutment engaged in an annular groove of radial orientation of the inner ferrule of the disc. However, such a configuration is complex to implement, as the holding device presents arrangements to consider during the mounting of the sampling members. Indeed, the flat spot must make it possible for the insertion in the inner ferrule via a cut-out and the sampling member must pivot by around 180° such that a portion of the collar is engaged in the lateral groove of the inner ferrule. Then, the annular abutment is engaged in the annular groove to axially immobilise each sampling member in the inner ferrule. Knowing that there are around several tens of air sampling members, the mounting timeframe is impacted. Moreover, the holding of the sampling member during the rotation of the turbine engine is not particularly effective against the effects of the centrifugal force.

Document US-A1-2007/0053770 describes a device example for holding sampling members, which are carried by a support element. The latter comprises a first annular arm of coaxial axis with a drive shaft of the turbine engine. The first annular arm is fixed, via a nut, on a second annular arm of the upstream disc. This second annular arm extends axially below the upstream disc. A portion of the first arm is in sealed connection with a portion of the evacuation channel of the air sampled by the air sampling members. However, the support element, the nut and the sealing elements impact on the mass of the turbine engine by their configuration. All these elements are also axially and radially bulky, and their integration in a reduced space is complex, in particular at the level of the central bore of the discs. In addition, the holding of the sampling members is not effective, in particular radially, especially during the rotation of the turbine engine against the effects of the centrifugal force.

Documents EP-A1-3135864 and U.S. Pat. No. 5,472,313 also describe air sampling members carried by holding devices.

3. AIM OF THE INVENTION

The present applicant has therefore set in particular as an aim to provide a device for holding a centripetal air sampling member allowing a holding of said sampling member and a compactness, both axial and radial.

4. SUMMARY OF THE INVENTION

This aim according to the invention is achieved, thanks to a device for holding a centripetal air sampling member for a rotor assembly comprising at least one upstream rotor disc, an adjacent downstream rotor disc and a centripetal air sampling member, the holding device comprising an annular support element, with a longitudinal axis, which comprises a radial axis housing substantially perpendicular to the longitudinal axis and intended to receive the air sampling member following a radial orientation, the support element comprising a first lateral extension extending substantially following the longitudinal axis, the holding device comprising a second lateral extension integral with the downstream rotor disc, extending substantially following the longitudinal axis and arranged radially externally with respect to the first extension, the holding device further comprising a wedging ring arranged axially between a portion of the downstream rotor disc and the support element, the wedging ring being configured so as to simultaneously urge, under the action of a centrifugal force, the first extension in radial abutment against the second extension and the support element in axial abutment against a portion of the upstream rotor disc.

Thus, this solution allows to achieve the abovementioned aim. In particular, such a configuration makes it possible to immobilise the sampling member, axially and radially, at least on one downstream rotor disc during the effects of the centrifugal force. The wedging ring immobilises, in particular, the support element radially on the annular element of a downstream disc and the axial extension axially immobilises the support element between the downstream rotor disc and an adjacent upstream disc preferably comprising, but in a non-limiting manner, an arrangement provided to this end. A simple configuration and an easy installation result from this. In addition, this configuration allow to reduce the radial bulk by avoiding the use, for example, of a flange extending below the disc and makes it possible, in particular, for a mass gain, given that no relatively heavy flange or systems occur, needing to be fixed for example by threaded elements.

According to another feature of the invention, the locking member is arranged such that when idle, the annular support element presents at least one radial clearance with respect to one of the rotor discs and that under the action of the centrifugal force, the support element bears against at least one of the rotor discs, with no clearance. The centrifugal force allows to reduce the clearances between the annular support element and the holding device to radially and axially immobilise the air sampling member.

According to another feature, the wedging ring presents a substantially truncated cross-section with a first truncated surface in contact with a second corresponding surface of the support element and a third truncated surface in contact with a fourth corresponding surface of the portion of the downstream rotor disc. Such a configuration makes it possible, in particular, for a better radial immobilisation of the support element on the rotor disc. Advantageously, but in a non-limiting manner, the annular portion of the rotor disc comprises a radially annular element.

Advantageously, but in a non-limiting manner, the wedging ring is opened by a slot. This configuration facilitates the installation of the wedging ring.

According to another feature, the holding device comprises a locking ring arranged between the air sampling member and the support element. Such a locking ring allows to axially immobilise the sampling member in the support element.

According to another feature of the invention, the locking ring is opened by a slot.

According to another feature, the locking ring presents a substantially inverted T-shaped cross-section with a first and second wing and a radial leg.

According to another feature of the invention, the leg of the locking ring is received in a groove formed by a radial arm protruding from a lower surface of an axial extension. This configuration allows a tight mounting of the air sampling member in the support element and to thus axially lock the air sampling member.

Also according to another feature of the invention, the first wing bears against a first end of the radial arm and/or the second wing bears against a radially inner annular surface of the base. This arrangement makes it possible to radially lock the base of the sampling member on the annular element carried by the rotor disc.

Advantageously, the holding device comprises an annular groove with a radial opening receiving the first extension.

The invention also concerns a rotor assembly comprising:
at least one upstream rotor disc and an adjacent and coaxial downstream rotor disc, the downstream disc comprising a radially inner annular ferrule,
a centripetal air sampling member,
a holding device having any one of the preceding features and supporting the air sampling member axially between the upstream rotor disc and the downstream rotor disc,
the radially inner annular ferrule being defined by the second extension comprising a groove receiving the first lateral extension of the support element.

According to another feature, the upstream rotor disc comprises a prominence intended to co-operate with the axial extension of the support element so as to axially immobilise the axial extension on the upstream rotor disc under the action of the centrifugal force. Under the action of the centrifugal force, the axial extension is thus pressed against the prominence which makes it possible to immobilise the support element on the upstream rotor disc which improves the axial holding and the axial compactness of the sampling member between the two adjacent discs.

According to another feature, the downstream rotor disc comprises a radially outer annular ferrule, coaxial with the radially inner annular ferrule, and comprising orifices, the air sampling member being arranged radially below the radially outer element.

The invention also concerns a turbine engine compressor comprising a rotor assembly presenting any one of the abovementioned features.

The invention also concerns a turbine engine comprising a compressor presenting the preceding features.

5. BRIEF DESCRIPTION OF THE FIGURES

The invention will be better understood, and other aims, details, features and advantages of it more clearly upon reading the following explanatory detailed description, of embodiments of the invention given as a purely illustrative and non-limiting example, in reference to the schematic drawings appended wherein.

6. DESCRIPTION OF EMBODIMENTS OF THE INVENTION

Figure 1:
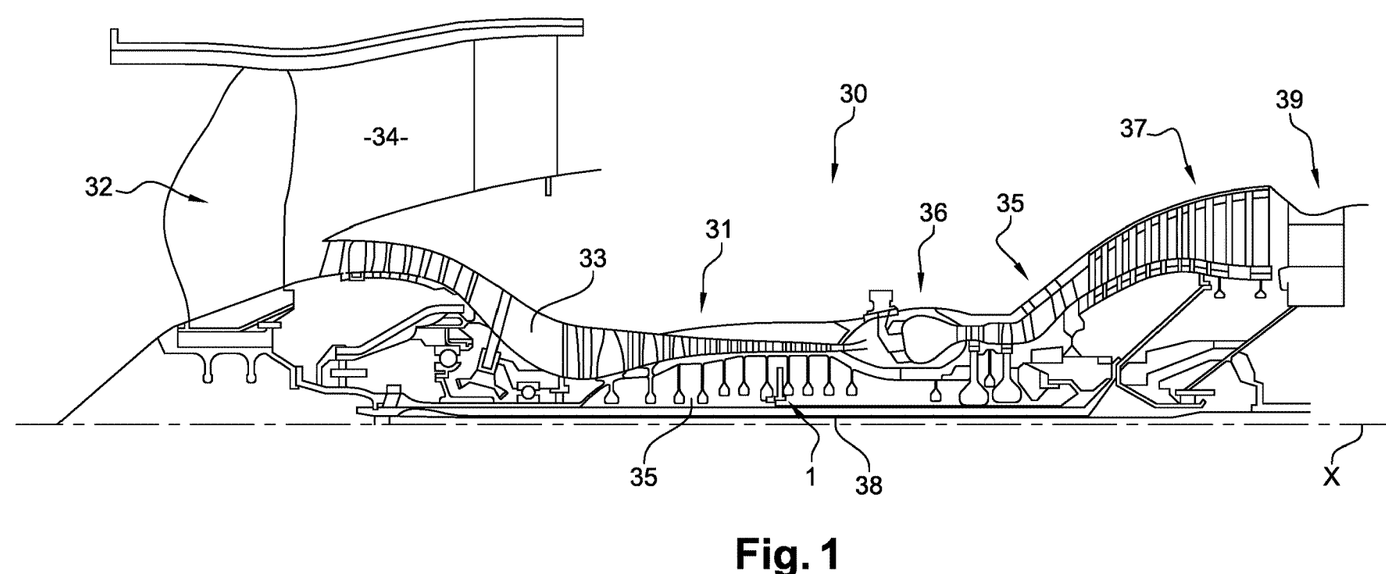
FIG. 1 schematically represents, in the axial cross-section, a bypass turbine engine example to which the invention applies.

FIG. 1 shows an axial cross-section of a turbine engine with longitudinal axis (X), and in particular, a bypass turbine engine according to the invention. Of course, the invention is not limited to this type of turbine engine.

The bypass turbine engine 30 generally comprises a gas generator 31 upstream of which is mounted a fan 32. In the present invention, and generally, the terms "upstream" and "downstream" are defined with respect to the circulation of gases in the turbine engine. The turbine engine 30 comprises an air inlet upstream of the fan 32 which generates an air flow being separated into a primary flow or hot air flow circulating in an annular primary duct 33 and in a secondary flow or cold air flow circulating in an annular secondary duct 34. The primary air flow passes through, from upstream to downstream, a compressor assembly 35, a combustion chamber 36 and a turbine assembly 37 forming the gas generator 31. The secondary flow circulates around the gas generator 31. The compressor assembly 35 comprises one or more compressor stage(s) and the turbine assembly 37 comprises one or more turbine stage(s) which drive(s) the compressor(s) via the intermediary of drive shafts 38 and by sampling combustion gases coming from the combustion chamber 36. The combustion gases are expelled into the atmosphere through a pipe 39 contributing to the thrust of the turbine engine.

Figure 2:
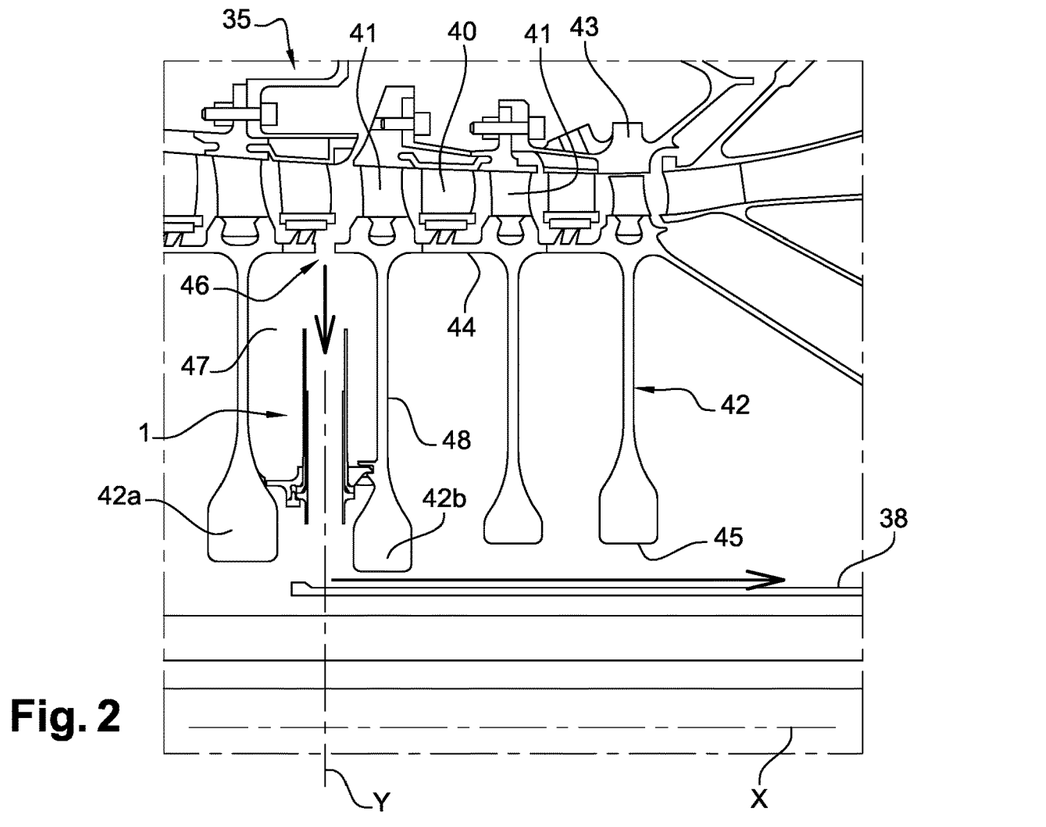
FIG. 2 is an axial and partial cross-sectional view of a turbine engine wherein are installed centripetal radial air sampling members carried by a holding device according to the invention.

In FIG. 2, a compressor rotor 35 is represented more specifically, comprising rows of stator blades 40 and rows of mobile blades 41 which are arranged axially alternately in the primary duct 33 of the turbine engine. The blades 40, 41 are passed through by the primary flow circulating in the primary duct. Each mobile blade 41 is integral with a rotor disc 42 extending radially below the primary duct 33. The term "radial" is defined with respect to an axis Y substantially perpendicular to the longitudinal axis X. The terms "below", "above", "lower" and "upper" are defined with respect to this radial axis Y (which is in the plane of FIGS. 1 and 5). The fixed blades are fixed to a casing 43 forming the radially outer wall of the primary duct. The rotor discs 42 each comprise an annular wall 48 extending radially and a central bore 45 through which extends at least one shaft 38, such as a turbine shaft. The central bore 45 is made at the level of the hub 26 of each disc which presents a widened expanded cross-section with respect to the side of the wall 48. The rotor discs 42 each comprise a radially outer annular element with axis X, here a radially outer ferrule 44, forming a portion of the radially inner wall of the primary duct. One of the radially outer ferrules 44 of a disc 42 connected to an adjacent disc, here upstream, each comprises orifices 46 with radial axis communicating with the primary duct. The orifices 46 open into an annular space 47 where the discs 42 are arranged. In FIG. 2, a centripetal air sampling member 1 is illustrated, which is radially oriented in the annular space 47 so as to sample air passing through the orifices 46 to cool the turbine shaft 38 which drives the compressor and/or possibly other members to be cooled. The sampling member is localised below the primary duct 33, and below the radially outer ferrule 44 of a disc 42. In particular, several sampling members 1 are circumferentially arranged around the axis of the turbine engine 30 and each is oriented towards an orifice 46.

Figure 3:
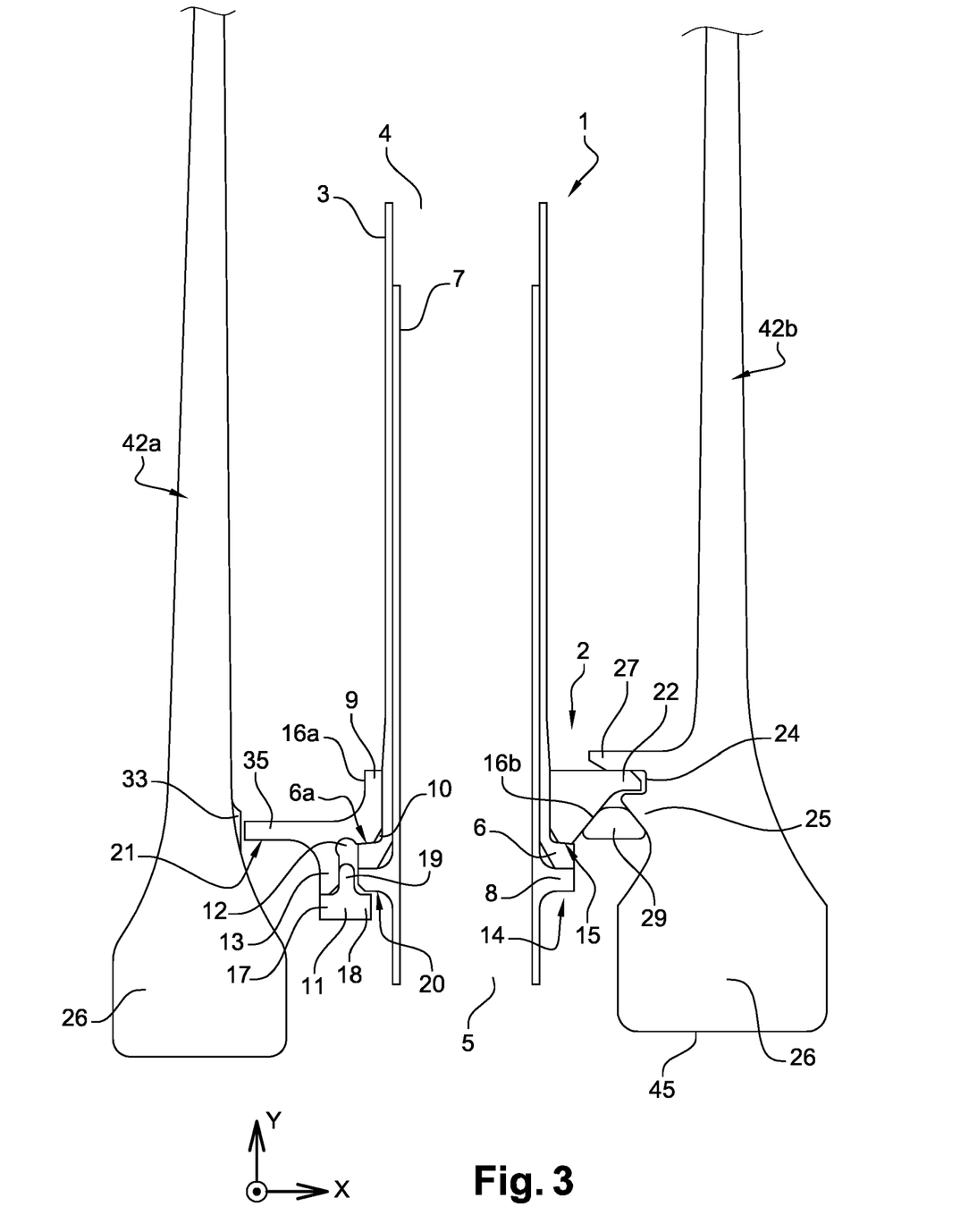
FIG. 3 illustrates, according to an axial cross-section, a centripetal radial air sampling member example, of which the holding device co-operates with rotor discs.

Below in the description, with respect to FIG. 3, only the arrangement of an air sampling member 1 will be described. Of course, the features of this air sampling member apply to all air sampling members installed in the turbine engine. In FIG. 3, the sampling member 1 is held in the annular space 47 and axially between two adjacent discs, here an upstream disc 42a and a downstream disc 42b by a holding device 2. Each sampling member 1 extends following the radial axis and comprises an annular base 14 axially protruding from its wall. The sampling member 1 comprises an air inlet tube 3 having an air inlet 4 and a radially opposite air outlet 5. The air inlet tube 3 comprises, towards its radially lower end, an annular surface 6 with radial axis. The air sampling member comprises a damping tube 7 which is engaged in the air inlet tube 3 so as to absorb the effects of the centrifugal force and vibrations appearing during the operation of the turbine engine. Advantageously, the damping tube 7 is formed of petals separated by slots and bears against the inner wall of the air inlet tube 3. The damping tube 7 also comprises, towards its radially inner end, a collar 8, with radial axis abutting against the surface 6 of the air inlet tube 3. The surface 6 of the air inlet tube 3 and the collar 8 of the damping tube 7 define the base 14 of the air sampling member. The holding device 2 comprises an annular support element 9 with axis substantially parallel to the longitudinal axis X. In particular, the support element 9 comprises a substantially cylindrical wall with longitudinal axis X forming a main body. The latter is held in the proximity of the hubs 26 of the adjacent discs, and axially together. The holding device 2 comprises locking means configured to immobilise at least radially and axially, the support element on at least one of the discs 42. The support element 9 comprises at least one cylindrical housing 10, such as a bore, passing through the wall of the main body of the support element 9 following the radial axis Y. In particular, the support element 9 comprises several housings 10 arranged in the main body. The wall forming the main body 9 is bored to form the housings 10. Each housing 10 is intended to receive an air sampling member following the radial axis Y. The air sampling member 1 is received in each housing 10 with an adjustment which is suitable for limiting or removing a degree of freedom following the longitudinal axis X. The housing 10 presents a diameter substantially equal to the outer diameter of the air inlet tube 2. The base 14 is bearing against a radially inner face 15 of the support element 9. In particular, the radially inner face 15, forms a shoulder. The radially inner spherical face 15, is preferably of complementary shape with a radially outer surface 6a of the surface 6. The radially inner face 15 and the radially outer surface 6a are in contact. Their complementarity makes it possible to optimise their co-operation and to limit the degree of freedom of the air sampling member with respect to the longitudinal axis X. The surface 6 of the air inlet tube and the collar 8 of the damping tube are arranged radially in the lower portion of the support element 9. In particular, the surface 6 of the air inlet tube bears against the radially inner face 15 of the support element 9.

Figure 5:
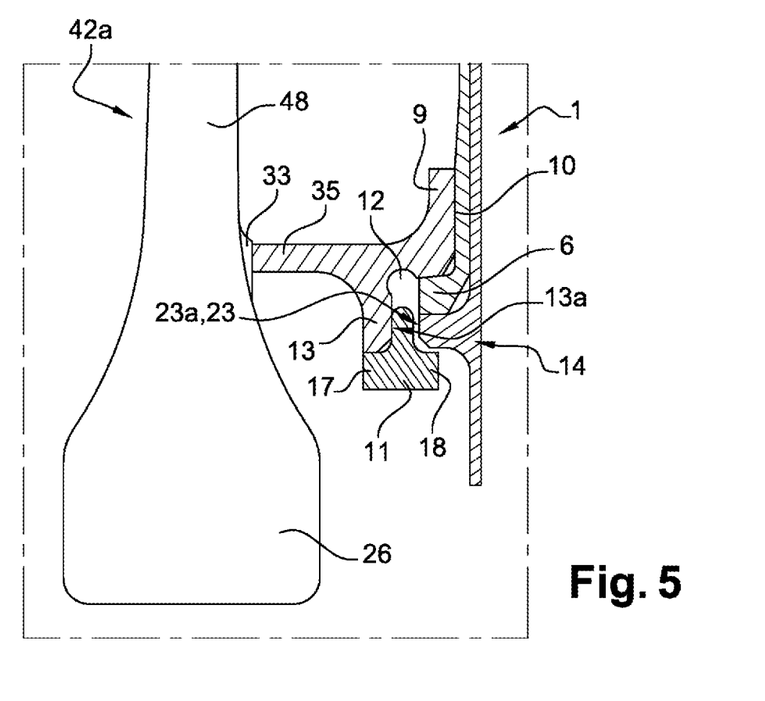
FIGS. 5 and 6 are axial cross-sectional and detailed views of FIG. 3.
Figure 7:
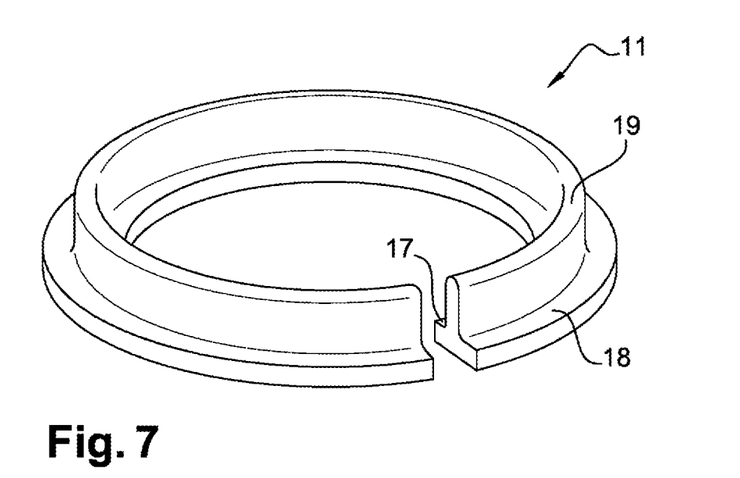
FIG. 7 is a perspective view of a locking ring example according to the invention.

In reference to FIGS. 3 and 5, the locking means comprise a locking ring 11, which makes it possible for a holding and/or a tight mounting of the sampling member 1 in the housing 10 and prevents the sampling member 1 from sliding radially inwards from the compressor. In other words, the locking ring 11 makes it possible for a radial locking of the sampling member 1 with respect to the support element 9. The locking ring 11 also allows a better holding of the air sampling member by immobilising it radially on the support element 9 under the action of the centrifugal force. As represented more specifically in FIG. 7, the locking ring 11 presents an inverted T-shaped transversal cross-section. This comprises a first wing 17 and a second wing 18 as well as an annular leg 19. The annular leg 19 extends following the radial axis Y. The first wing 17 is capable of bearing against a face of a free end of an annular arm 13 of the support element 9 according to the operation status (or not) of the turbine engine. Regarding the second wing 18, this one is capable of bearing against a radially inner annular surface 20 of the base 14, here the collar 8 of the damping tube 7, according to the operating status (or not) of the turbine engine. A portion of the base 14 is, after mounting, radially arranged between the main body of the support element 9 and the locking ring 11. The arm 13 extends radially and internally (towards the longitudinal axis X of the turbine engine) from an inner surface 21 of an axial extension 35 of the support element 9 acting as a locking means. The axial extension 35 extends from a first edge 16a of the main body of the support element 9. The radial arm 13 extends into a plane which is offset and substantially parallel to that of the first edge 16a such that, once the air sampling member 1 is assembled in a housing 10, the air sampling member 1, and in particular its base 14, is at a distance from the portion of the radial arm 13. In other words, the radial arm 13 is arranged at a distance, axially from the base 14 of the air sampling member 1. A groove 12 is thus formed between the radial arm 13 and the base 14. A portion of the locking ring 11 is arranged such that the base 14 is held at least at a small distance from or in contact with the radially inner face 15 without any action of the centrifugal force (non-rotating rotor). Under the action of the centrifugal force, the base 14 is pressed against the radially inner face 15. The annular leg 19 of the locking ring 11 is arranged in the groove 12, and in particular between a radially inner face 13a of the arm 13 and an edge 23. The radially inner face 13a of the arm 13 is oriented towards the base 14 of the sampling member 1. The edge 23 is formed by the outer surfaces of the collar 8 and of the surface 6. The edge 23 of the base 14 comprises a flat spot 23a with which the leg 19 of the locking ring co-operates so as to limit the degree of freedom of rotation, with respect to the radial axis Y, of the sampling member with respect to the support element 9. Advantageously, but in a non-limiting manner, the locking ring 11 is split so as to facilitate its installation. In other words, the locking ring 11 is opened by a slot separating two free ends of the ring 11. The locking ring 11 is made of a metal material. An example of metal material or a metal material-based alloy is an Inconel® 718 or a titanium alloy such as a Ti17 according to the desired mechanical features and of the temperature of the compressor.

Figure 4:
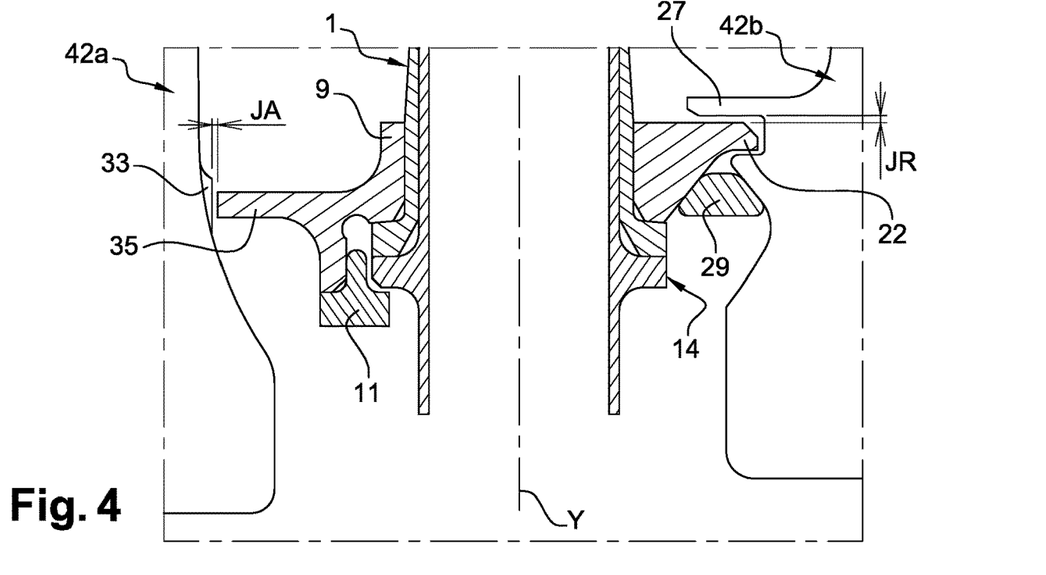
FIG. 4 illustrates, according to an axial, partial and detailed cross-section, a centripetal radial air sampling member example mounted in a housing of a holding device when the turbine engine is switched off, without any action of the centrifugal force.
Figure 6:
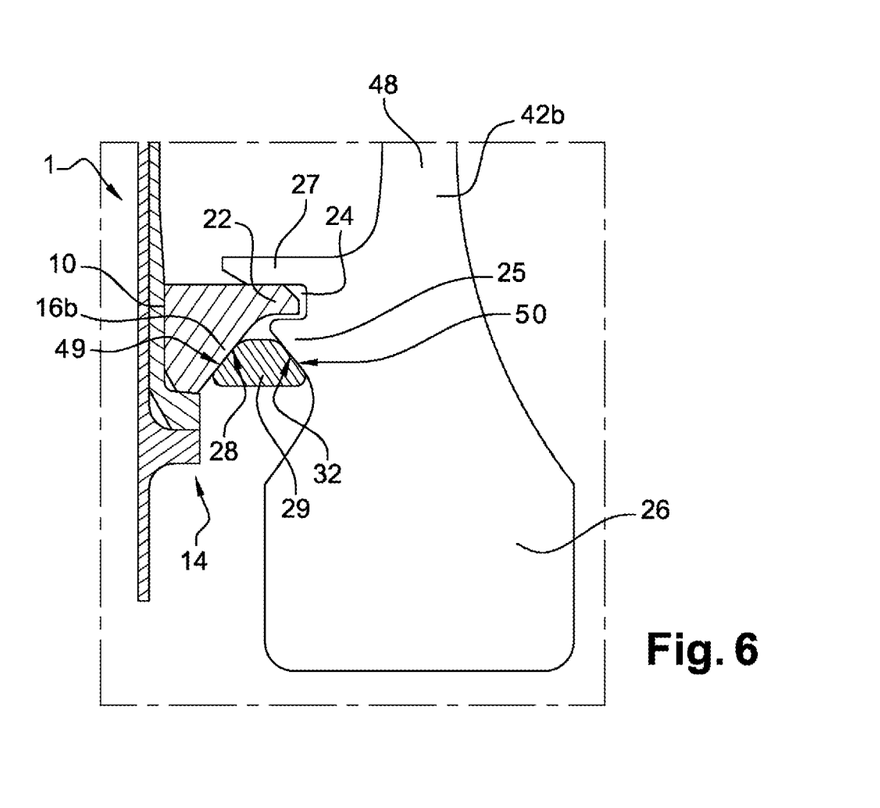

In reference to FIGS. 3 and 6, the support element 9 comprises a first lateral extension 22 which extends axially. The first extension protrudes from a second annular edge 16b. The latter is axially opposite the first edge 16a. The first lateral extension 22 is axially opposite the axial extension 35. In the present example, the first lateral extension 22 extends into a plane substantially radially offset with respect to that of the axial extension 35. The plane of the first extension 22 radially extends above that of the axial extension 35. This first extension 22 is, in this embodiment example, received and housed in an annular groove 24 with a lateral opening of the downstream disc 42b. Preferably, but in a non-limiting manner, the first extension is housed with a clearance in the groove 24 so as to enable its dilatation as illustrated in FIG. 4. More specifically, the groove 24 is formed by a rib 25 extending axially from a lateral face of the disc 42, here the downstream disc 42b and radially below a second lateral extension, here a radially inner annular ferrule 27 of the downstream disc 42b. The radially inner ferrule 27 is coaxial with the radially outer ferrule 44. This one is oriented towards the air sampling member when the latter is mounted in one of the housings 10. The first extension 22 is mounted at a small distance from the radially inner ferrule 27 (non-rotating rotor). More specifically, as stated above and illustrated in FIG. 4, a radial clearance JR is provided between the first extension and the second extension 27. The second edge 16b presents a truncated surface 28. The truncated surface 28 is inclined by a predetermined angle with respect to the radial axis Y. The predetermined angle α is of between 35° and 50°.

Figure 8:
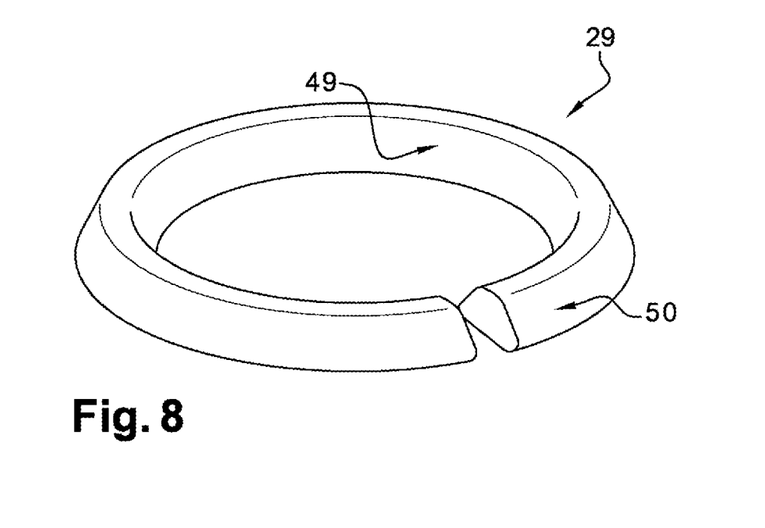
FIG. 8 is a perspective of a wedging ring example according to the invention.

The holding device 2 further comprises a wedging ring 29 arranged axially between a portion of the downstream rotor disc 42b and the support element 9. In particular, the wedging ring is mounted axially between the rib 25 and the support element. This wedging ring 29 is configured so as to radially immobilize the first extension 22 on the ferrule 27, under the action of the centrifugal force when the turbine engine is operating. For this, the wedging ring 29 has a substantially truncated cross-section. At least two surfaces of the wedging ring 29 co-operate with corresponding surfaces of the support element 9 and of the disc 42. The wedging ring 29, more specifically illustrated in FIGS. 6 and 8, presents more specifically, a first upstream truncated surface 49, in contact with a second corresponding surface, defined here by the truncated surface 28 of the second edge 16b. The wedging ring 29 comprises a third truncated surface 50 in contact with a fourth corresponding surface 32 of the disc 42. This fourth surface 32 is supported by the edge of the rib 25 of the downstream disc 42b. The third and fourth truncated surfaces are arranged facing one another. The wedging ring 29 with its truncated surfaces 49, 50 is arranged between them. The truncated surfaces 49, 50 of the wedging ring also make it possible to adjust the positioning of the wedging ring between the disc and the support element 9. Advantageously, the wedging ring 29 is split so as to facilitate its installation. In other words, the wedging ring 29 is opened by a slot separating two free ends of the ring 29. Preferably, but in a non-limiting manner, the wedging ring is made of a metal material. An example of metal material or metal material-based alloy is Inconel 718 or a titanium alloy such as a Ti17 according to the desired mechanical features and of the temperature of the compressor.

As can be seen in FIGS. 3 and 5, the axial extension 35 is arranged facing the upstream disc 42a. In particular, the upstream disc 42a comprises a prominence 33 extending axially from an inner face of the upstream disc 42b. This is oriented towards the air sampling member when it is mounted in one of the housings of the support element 9. The prominence 33 is localised in the proximity of the hub 26 of the upstream disc 42b. The axial extension 35 is opposite this prominence 33. The latter has a substantially rectangular-shaped cross-section. In particular, the prominence 33 presents a thickness increasing following a radial direction, perpendicular to the radial axis Y.

As can be seen in FIG. 4, upon mounting, the first extension 22, when idle, axially overlaps with the second extension 27. In particular, the support element 9 is mounted with at least one radial clearance JR with respect to the downstream disc 42b. The first extension 22 is at a small radial distance with the second extension 27. An axial clearance JA is also provided between the support element 9 and the upstream disc 42a. The free end of the axial extension 35 is at a distance axially from the prominence 33 of the upstream disc 42a.

During the operation of the turbine engine, the resulting centrifugal force passing through the first and third truncated surfaces 49, 50 of the wedging ring 29 make it possible for the latter to immobilize the first extension 22 in the groove 24 and in particular, radially against the inner radial ferrule 27 under the action of the centrifugal force. Simultaneously, the axial extension 35 of the support element 9, is pressed against the thickest portion of the prominence 33 so as to axially immobilize the support element 9 on the upstream disc 42a. The radial JR and axial JA clearances between the support element 9 and the rotor discs 42a, 42b are reduced, even removed. This arrangement thus presents an axial and radial compactness, as well as a good axial and radial holding during the operation of the turbine engine.

The invention claimed is:

1. A holding device for holding a centripetal air sampling member for a rotor assembly, the rotor assembly comprising an upstream rotor disc, an adjacent downstream rotor disc, and the centripetal air sampling member, the holding device comprising:
- an annular support element with a longitudinal axis, comprising:
  - a housing having a radial axis perpendicular to the longitudinal axis and configured to receive the air sampling member along the radial axis,
  - a first lateral extension extending in a first direction parallel to the longitudinal axis, and
  - a second lateral extension integral with the downstream rotor disc, extending in a second direction parallel to the longitudinal axis, and arranged radially external with respect to the first extension; and
- a wedging ring arranged axially between a portion of the downstream rotor disc and the annular support element, the wedging ring being configured to simultaneously urge, under an action of a centrifugal force, the first extension in radial abutment against the second extension and the annular support element in axial abutment against a portion of the upstream rotor disc.

2. The holding device according to claim 1, wherein the wedging ring is arranged such that the annular support element presents at least one radial clearance with respect to one of the upstream or downstream rotor discs and that under the action of the centrifugal force, the annular support element bears against at least one of the upstream or downstream rotor discs without any clearance.

3. The holding device according to claim 1, wherein the wedging ring presents a truncated cross-section with a first truncated surface in contact with a corresponding second surface of the annular support element and a third truncated surface in contact with a fourth corresponding surface of the portion of the downstream rotor disc.

4. The holding device according to claim 1, wherein the wedging ring is opened by a slot.

5. The holding device according to claim 1, further comprising a locking ring arranged between the air sampling member and the annular support element.

6. The holding device according to claim 5, wherein the locking ring is opened by a slot.

7. The holding device according to claim 5, wherein the locking ring presents an inverted T-shaped cross-section with a first and a second wing and a radial leg.

8. The holding device according to claim 7, wherein the radial leg of the locking ring is received in a groove formed by a radial arm which protrudes from a lower surface of an axial extension and by a base.

9. The holding device according to claim 7, wherein the first wing bears against a free end of a radial arm and/or the second wing bears against a radially inner annular surface of a base.

10. A rotor assembly, comprising:
the holding device according to claim 1, wherein the air sampling member is supported axially between the upstream rotor disc and the downstream rotor disc, and wherein the downstream rotor disc comprises a radially inner annular ferrule, the radial annular inner ferrule being defined by the second lateral extension comprising a groove that receives the first lateral extension of the annular support element.

11. The rotor assembly according claim 10, wherein the upstream rotor disc comprises a prominence configured to cooperate with an axial extension of the annular support element to axially immobilize the axial extension on the upstream rotor disc under the action of the centrifugal force.

12. The rotor assembly according claim 10, wherein the downstream rotor disc comprises a radially outer annular ferrule, coaxial with the radially inner annular ferrule and wherein the radially outer annular ferrule comprises orifices, the air sampling member being arranged radially below the radially outer annular ferrule.

13. A turbine engine compressor comprising the rotor assembly according to claim 10.

14. A turbine engine comprising the compressor according to claim 13.

* * * * *

UNITED STATES PATENT AND TRADEMARK OFFICE
CERTIFICATE OF CORRECTION

| | |
|---|---|
| PATENT NO. | : 11,371,352 B2 |
| APPLICATION NO. | : 16/761762 |
| DATED | : June 28, 2022 |
| INVENTOR(S) | : T. Delahaye et al. |

It is certified that error appears in the above-identified patent and that said Letters Patent is hereby corrected as shown below:

On the Title Page

| Column | Line | |
|---|---|---|
| 2 | 2 | Item (57) change "includes and downstream" to -- includes downstream -- |

In the Claims

| Column | Line | |
|---|---|---|
| 10 | 23 | Claim 11 change "according claim" to -- according to claim -- |

Signed and Sealed this
Fifteenth Day of August, 2023

Katherine Kelly Vidal
*Director of the United States Patent and Trademark Office*